US012095490B2

(12) United States Patent
Shih

(10) Patent No.: US 12,095,490 B2
(45) Date of Patent: Sep. 17, 2024

(54) APPARATUS AND METHOD OF HARMONIC INTERFERENCE CANCELLATION

(71) Applicant: ZEKU TECHNOLOGY (SHANGHAI) CORP., LTD., Shanghai (CN)

(72) Inventor: Huei Yuan Shih, San Diego, CA (US)

(73) Assignee: ZEKU TECHNOLOGY (SHANGHAI) CORP., LTD., Shanghai (CN)

( * ) Notice: Subject to any disclaimer, the term of this patent is extended or adjusted under 35 U.S.C. 154(b) by 84 days.

(21) Appl. No.: 17/946,418

(22) Filed: Sep. 16, 2022

(65) Prior Publication Data

US 2023/0016762 A1 Jan. 19, 2023

Related U.S. Application Data

(63) Continuation of application No. PCT/US2021/020766, filed on Mar. 3, 2021.
(Continued)

(51) Int. Cl.
*H04B 1/12* (2006.01)
*H04B 1/525* (2015.01)
*H04L 27/34* (2006.01)

(52) U.S. Cl.
CPC ............. *H04B 1/123* (2013.01); *H04B 1/525* (2013.01); *H04L 27/34* (2013.01)

(58) Field of Classification Search
CPC .......... H04B 1/123; H04B 1/525; H04B 1/68; H04L 27/34; H04L 5/001; H04L 27/02
(Continued)

(56) References Cited

U.S. PATENT DOCUMENTS 6,400,775 B1 * 6/2002 Gourgue ............... H03F 1/3247
330/149
8,489,042 B1 7/2013 Hietala
(Continued)

FOREIGN PATENT DOCUMENTS

CN 101277120 A 10/2008
CN 102315855 A 1/2012
(Continued)

OTHER PUBLICATIONS

First Office Action issued in corresponding Chinese application No. 202180021915.9, mailed Apr. 28, 2023.
(Continued)

*Primary Examiner* — Emmanuel Bayard
(74) *Attorney, Agent, or Firm* — BAYES PLLC

(57) ABSTRACT

A baseband chip may include a transmitter configured to transmit a first signal. The baseband chip may also include a receiver configured to receive a second signal that includes a receive signal portion and a harmonic interference portion leaked from the transmitter. The baseband chip may further include a harmonic model block configured to multiply a first output from a first harmonic model associated with an amplitude modulation phase modulation (AMPM) look-up table (LUT) and a second output of a second harmonic model associated with an AMAM LUT to generate a third output. The harmonic model block may be further configured to estimate the harmonic interference portion based at least in part on the third output. The baseband chip may also include an interference cancellation block configured to cancel the harmonic interference portion from the second signal to obtain the receive signal portion.

17 Claims, 8 Drawing Sheets

Related U.S. Application Data

(60) Provisional application No. 62/991,355, filed on Mar. 18, 2020.

(58) Field of Classification Search
USPC ........ 375/219, 224, 259, 295–297, 346, 350
See application file for complete search history.

(56) References Cited

U.S. PATENT DOCUMENTS

| | | | |
|---|---|---|---|
| 8,855,580 B2* | 10/2014 | Dent | H04B 1/525 |
| | | | 455/296 |
| 9,634,695 B1 | 4/2017 | Subrahmaniyan Radhakrishnan et al. | |
| 2007/0184782 A1* | 8/2007 | Sahota | H04B 1/10 |
| | | | 455/63.1 |
| 2007/0296494 A1* | 12/2007 | Hongo | H03F 1/3282 |
| | | | 330/149 |
| 2009/0051426 A1* | 2/2009 | Ba | H03F 1/3247 |
| | | | 330/149 |
| 2009/0085658 A1* | 4/2009 | Liu | H03F 3/21 |
| | | | 330/149 |
| 2010/0279617 A1* | 11/2010 | Osman | H04B 1/525 |
| | | | 455/63.1 |
| 2014/0161159 A1* | 6/2014 | Black | H04B 1/525 |
| | | | 375/219 |
| 2014/0192922 A1* | 7/2014 | Wyville | H04B 1/62 |
| | | | 375/295 |
| 2014/0218107 A1 | 8/2014 | Geng et al. | |
| 2014/0247757 A1* | 9/2014 | Rimini | H04B 1/525 |
| | | | 370/278 |
| 2014/0301498 A1* | 10/2014 | Rimini | H04B 1/12 |
| | | | 375/285 |
| 2015/0065058 A1 | 3/2015 | Wang et al. | |
| 2015/0180685 A1* | 6/2015 | Noest | H04B 1/40 |
| | | | 375/219 |
| 2015/0311927 A1 | 10/2015 | Beidas et al. | |
| 2015/0311929 A1* | 10/2015 | Carbone | H04B 1/123 |
| | | | 455/78 |
| 2016/0072530 A1 | 3/2016 | El-Hassan et al. | |
| 2016/0156486 A1 | 6/2016 | Ljung et al. | |
| 2016/0204809 A1* | 7/2016 | Pratt | H04B 1/0475 |
| | | | 375/219 |
| 2016/0253288 A1 | 9/2016 | Reddy | |
| 2017/0070258 A1 | 3/2017 | Shih | |
| 2017/0192099 A1* | 7/2017 | Lin | H04B 1/3805 |
| 2019/0238101 A1 | 8/2019 | Song | |

FOREIGN PATENT DOCUMENTS

| | | |
|---|---|---|
| CN | 103814520 A | 5/2014 |
| CN | 103904652 A | 7/2014 |
| CN | 104678407 A | 6/2015 |
| CN | 104871433 A | 8/2015 |
| CN | 105549097 A | 5/2016 |
| CN | 105634539 A | 6/2016 |
| CN | 105866543 A | 8/2016 |
| CN | 106017509 A | 10/2016 |
| CN | 107925429 A | 4/2018 |
| CN | 109428624 A | 3/2019 |
| CN | 110661546 A | 1/2020 |
| CN | 110858979 A | 3/2020 |
| IN | 103843248 A | 6/2014 |
| WO | 2018044432 A1 | 3/2018 |
| WO | 2018222814 A1 | 12/2018 |
| WO | 2019132949 A1 | 7/2019 |

OTHER PUBLICATIONS

Andreas Gebhard et al., "Adaptive Self-Interference Cancelation in LTE-A Carrier Aggregation FDD Direct-Conversion Transceivers", Published in: 2016 IEEE Sensor Array and Multichannel Signal Processing Workshop (SAM), Date of Conference: Jul. 10-13, 2016.

Li Lu, "Research on Compensation of Nonlinear Distortion in Wideband Receivers", China Master's Theses Full-text Database, Release Date: Jun. 15, 2015.

International Search Report issued in International application No. PCT/US2021/020766, mailed May 20, 2021.

Written Opinion of the International Searching Authority issued in International application No. PCT/US2021/020766, mailed May 20, 2021.

Notification to Grant Patent Right for Invention issued in corresponding Chinese application No. 202180021915.9, mailed Sep. 1, 2023.

Design and implementation of special baseband chip for power wireless communication, Products & Technology•Automation, Electrical Age • Issue 5, 2015, 8 pages.

* cited by examiner

APPARATUS AND METHOD OF HARMONIC INTERFERENCE CANCELLATION

CROSS-REFERENCE TO RELATED APPLICATIONS

This application is a continuation of International Application No. PCT/US2021/020766, filed on Mar. 3, 2021, which claims the benefit of priority to U.S. Provisional Application No. 62/991,355 filed on Mar. 18, 2020, both of which are incorporated herein by reference in their entireties.

BACKGROUND

Embodiments of the present disclosure relate to apparatus and method for wireless communication.

Wireless communication systems are widely deployed to provide various telecommunication services such as telephony, video, data, messaging, and broadcasts. In cellular communication, such as the 4th-generation (4G) Long Term Evolution (LTE) and the 5th-generation (5G) New Radio (NR), the 3rd Generation Partnership Project (3GPP) defines various mechanisms for signal detection, e.g., such as multiple-input multiple-output (MIMO) detection.

SUMMARY

Embodiments of apparatus and method for harmonic interference cancellation are disclosed herein.

According to one aspect of the present disclosure, a baseband chip is disclosed. The baseband chip may include a transmitter configured to transmit a first signal. The baseband chip may also include a receiver configured to receive a second signal. The first signal and the second signal may be transmitted and received concurrently via carrier aggregation (CA). The second signal may include a receive signal portion and a harmonic interference portion. The harmonic interference portion may be associated with a leakage of the first signal to the receiver. The baseband chip may further include a harmonic model block configured to multiply a first output from a first harmonic model associated with an amplitude modulation phase modulation (AMPM) look-up table (LUT) and a second output of a second harmonic model associated with an amplitude modulation amplitude modulation (AMAM) LUT to generate a third output. The harmonic model block may be further configured to estimate the harmonic interference portion based at least in part on the third output. The baseband chip may also include an interference cancellation block configured to cancel the harmonic interference portion from the second signal to obtain the receive signal portion.

According to another aspect of the present disclosure, a baseband chip is provided that includes a transmitter configured to a transmitter configured to transmit a first signal, and a receiver configured to receive a second signal, where the first signal and the second signal may be transmitted and received concurrently via CA. The second signal may be a receive signal portion and a harmonic interference portion. The harmonic interference portion may be associated with a leakage of the first signal to the receiver. The baseband chip may further include a memory and at least one processor coupled to the memory and configured to perform various operations associated with harmonic interference cancellation. The at least one processor may be configured to multiply a first output from a first harmonic model associated with an AMPM LUT and a second output of a second harmonic model associated with an AMAM LUT to generate a third output. The at least one processor may be further configured to estimate the harmonic interference portion based at least in part on the third output. The at least one processor may also be configured to cancel the harmonic interference portion from the second signal to obtain the receive signal portion.

According to still another aspect of the present disclosure, a method of wireless communication is provided. The method may include transmitting, by a transmitter, a first signal. The method may further include receiving, by a receiver, a second signal, the first signal and the second signal being transmitted and received concurrently via CA. The second signal may include a receive signal portion and a harmonic interference portion. The harmonic interference portion may be associated with a leakage of the first signal to the receiver. The method may also include multiplying a first output from a first harmonic model associated with an AMPM LUT and a second output of a second harmonic model associated with an AMAM LUT to generate a third output. The method may further include estimating the harmonic interference portion based at least in part on the third output. The method may also include cancelling the harmonic interference portion from the second signal to obtain the receive signal portion.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
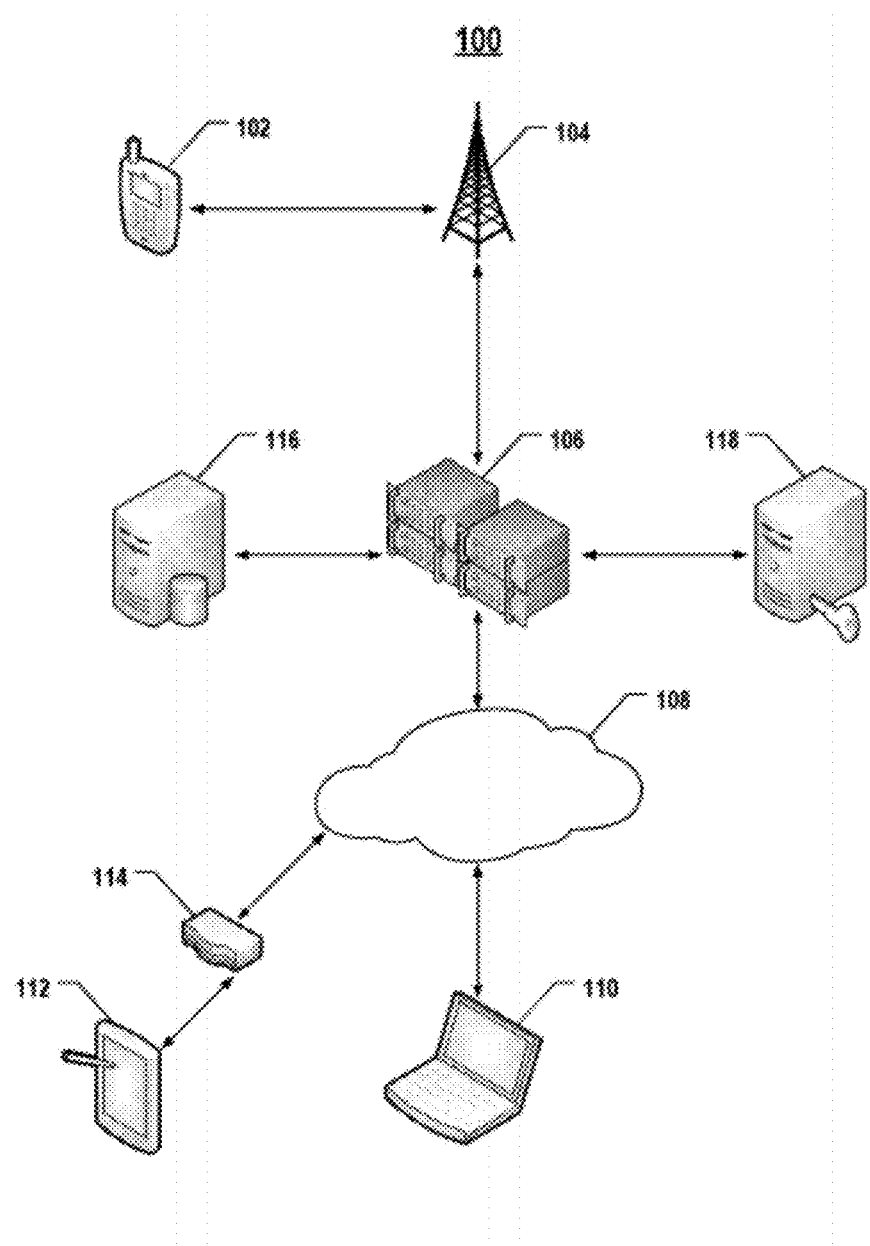
FIG. 1 illustrates an exemplary wireless network, according to some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, wireless local area network (WLAN) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as the Global System for Mobile Communications (GSM). An OFDMA network may implement a RAT, such as LTE or NR. A WLAN system may implement a RAT, such as Wi-Fi. The techniques described herein may be used for the wireless networks and RATs mentioned above, as well as other wireless networks and RATs.

To extend smartphone battery lifetime, the radio frequency power amplifier (RFPA) may be configured to operate at saturation to increase power efficiency. However, this can introduce harmonic interference at the receiver operating at harmonic frequencies due to the strong nonlinearity of the RFPA. For example, due to the nonlinearity of the RFPA out-of-band harmonic interference and/or in-band harmonic interference may occur. Out-of-band harmonic interference (also referred to as "$2^{nd}$ order harmonic interference" or "$2^{nd}$ harmonic interference") may occur in frequency bands outside of the receive (RX) signal frequency band. In-band harmonic interference (also referred to as "$3^{rd}$ order harmonic interference" or "$3^{rd}$ harmonic interference") may occur in the same frequency band as the RX signal.

The direct consequences of harmonic interference include receiver sensitivity degradation or even jamming Conventional digital and analog filters (e.g., duplexer, diplexer, and surface acoustic wave (SAW) filter, etc.) are generally unable to remove or attenuate $3^{rd}$ order harmonic interference since this type of interference is located in-band with the RX signal instead of the adjacent band. A notch filter can be placed after the RFPA to attenuate harmonic interference, but the insertion loss of the notch filter reduces the RFPA output power and degrades the efficiency of the device. The harmonic interference can be removed in the baseband digital domain if the harmonic between transmit signal and the measured harmonic interference signal can be determined.

For example, a transceiver in a telecommunications network (e.g., a cellular system) may transmit and receive simultaneously in different frequency bands. Harmonic interference at the receiver may be induced by self-jamming leakage of transmit (TX) signals that are simultaneously transmitted by the transmitter of the same device. The TX signals may leak into the receive path through the finite isolation between the transmit and receive paths. For example, in embodiments featuring LTE band 3 (B3)/band 42 (B42) carrier aggregation, the $2^{nd}$ harmonic interference generated by nonlinearities of the B42 TX spectrum leaks into the B4 RX spectrum, thus creating co-channel interference. This co-channel interference (also referred to a "$2^{nd}$ harmonic interference") may degrade B4 receiver sensitivity.

One conventional approach for canceling $2^{nd}$ harmonic interference from the RX signal involves estimating the $2^{nd}$ harmonic interference with complex polynomial modelling and then subtracting the estimated harmonic interference from the RX signal. However, complex polynomial-based harmonic modelling requires a large number of multipliers that consume an undesirable amount of power, thereby reducing the lifetime of the battery. Furthermore, the estimation error of the harmonic interference is sensitive to the model order selection and the linearity of the RFPA, which may limit the accuracy of the harmonic interference estimated using the complex polynomial-based harmonic model.

Another conventional approach to $3^{rd}$ harmonic interference cancellation involves a polar-based LUT used to estimate the harmonic interference before subtracting the estimated interference from the received signal. The performance of the polar-based LUT model is a function of the LUT size since the estimated harmonic signal is obtained by direct mapping. Increasing the number of entries in the polar-based LUT may minimize the prediction error of the harmonic signal model and enhance the cancellation performance of such an approach. However, the power consumption and silicon footprint of the LUT are proportional to the number of entries in the polar-based LUT. To maintain a polar-based LUT of a smaller size, linear interpolation can be employed to improve the performance of the harmonic model. However, to perform real-time or high-speed harmonic modeling using a smaller polar-based LUT requires doubling the size of the LUT. Moreover, a multiplier is required to implement the linear interpolation operating in the real-time mode, which increases the power consumption and reduces battery lifetime by an undesirable amount. Furthermore, using this conventional approach requires multiple LUTs since the behavior of harmonic interference differs depending on the TX power. Consequently, an LUT is required for each of the possible TX powers, which increases the number of memory and computational resources required to perform real-time harmonic modelling using polar-based LUT.

To solve these problems, the present disclosure provides an IQ LUT architecture that minimizes the silicon footprint of the harmonic interference model and enhances the cancellation performance, e.g., as described below in connection with FIGS. 1-6. The estimated harmonic interference is obtained using a harmonic model that uses an embedded AMAM LUT/AMPM LUT to estimate harmonic interference through complex multiplication of the output of each of the AMAM LUT and the AMPM LUT. For example, the AMAM LUT may correlate the harmonic signal gain as a function of the TX envelope. The AMPM LUT may correlate the nonlinearity of the harmonic phase φ as a function of TX envelope. The TX phase change rate (N−1)φ may be added after indexing the AMPM LUT, where N is the order (e.g., $2^{nd}$, $3^{rd}$, $4^{th}$, $N^{th}$, etc.) of the harmonic interference to be cancelled. Moreover, the magnitude of the harmonic interference may be determined based at least in part on the TX power of the RFPA.

Figure 4:
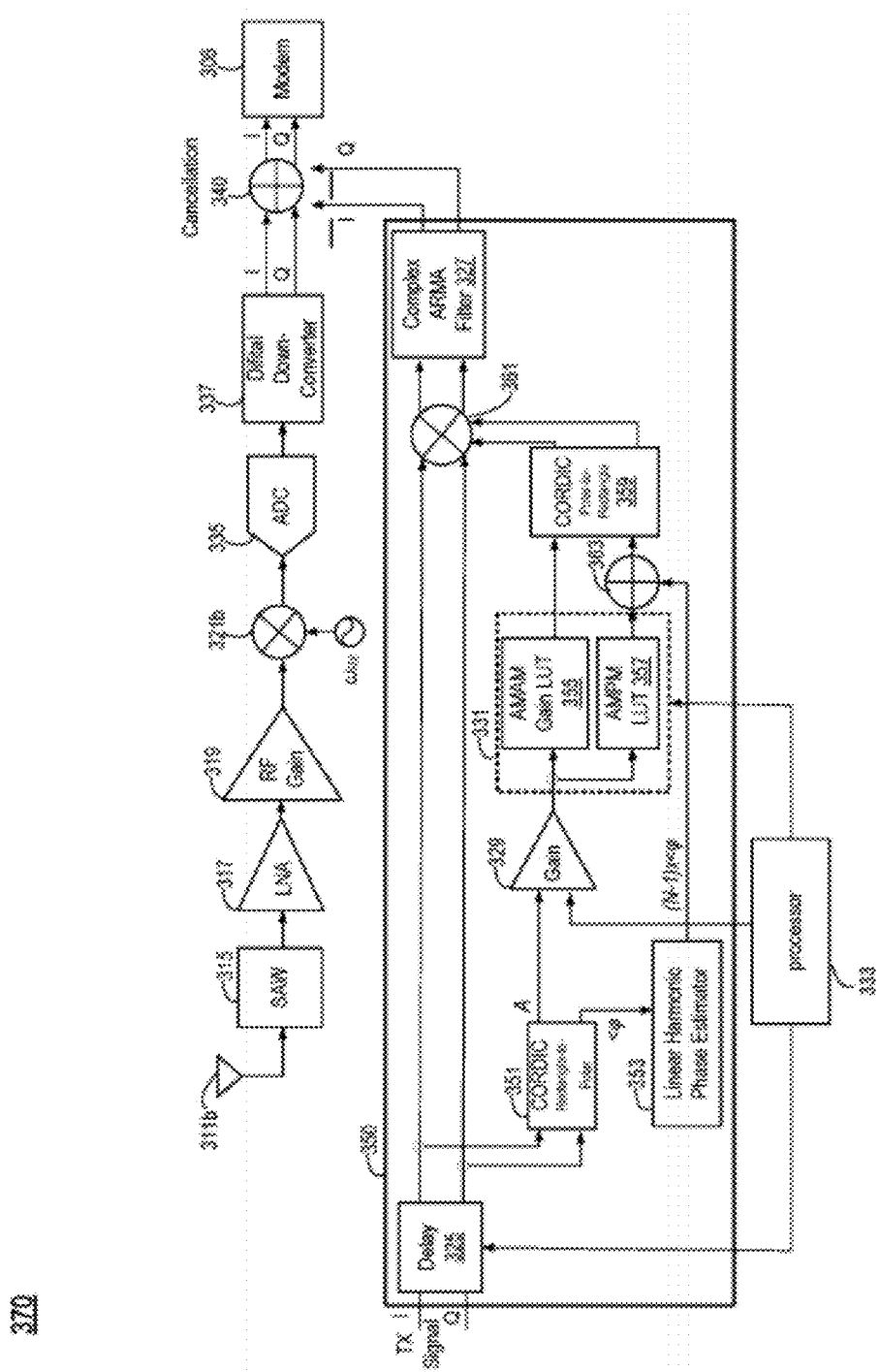
FIG. 4 illustrates an expanded view of the harmonic model block of FIG. 3, according to some embodiments of the present disclosure.
Figure 5:
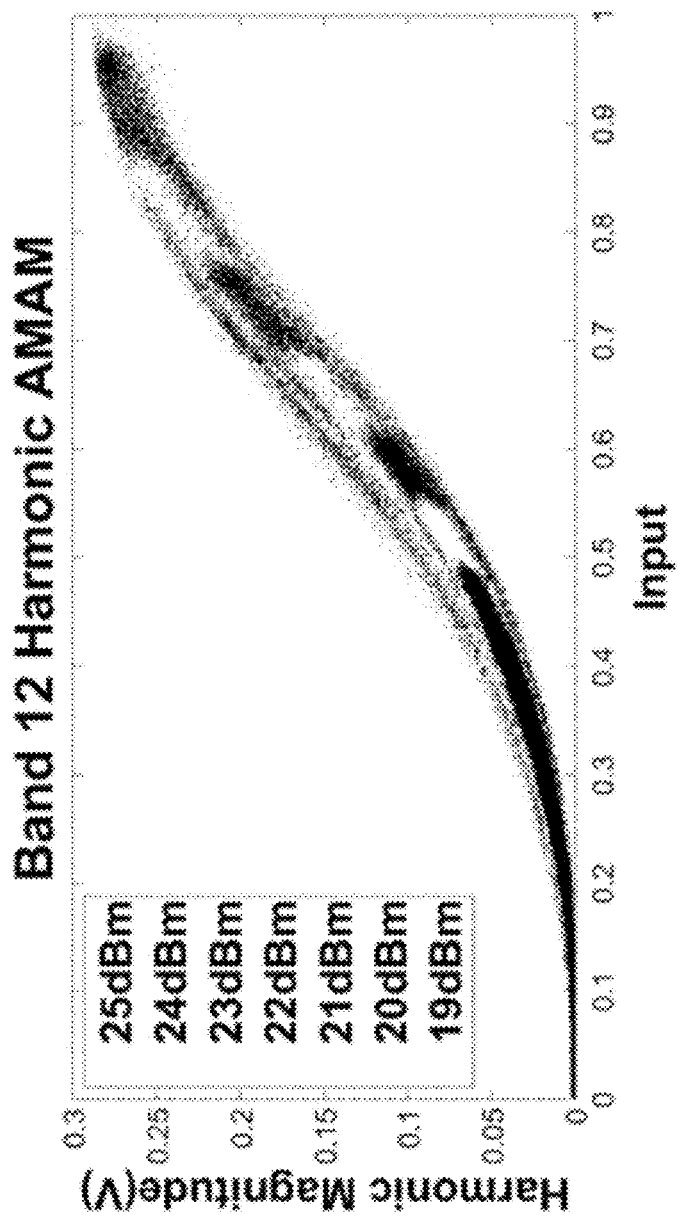
FIG. 5 illustrates a graphical representation of an AMAM LUT associated with $3^{rd}$ harmonic interference that may be used by the harmonic model block of FIG. 3, according to some embodiments of the present disclosure.

As shown in FIG. 5, the characterization of the harmonic interference as a function of the TX baseband can be obtained from the maximal output power, 25 dBm, of a TX power amplifier (PA). For the smaller power from 24-19 dBm, the model maintained by the AMAM LUT is truncated at the output power, which eliminates the need for multiple LUT, and hence minimizes silicon resource. Using these techniques and those described below in connection with FIGS. 1-6, the harmonic interference may be estimated using a significantly reduced amount of power and with a reduced silicon footprint as compared to those conventional approaches discussed above.

FIG. 1 illustrates an exemplary wireless network 100, in which certain aspects of the present disclosure may be implemented, according to some embodiments of the present disclosure. As shown in FIG. 1, wireless network 100 may include a network of nodes, such as a user equipment (UE) 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. It is understood that access node 104 is illustrated by a radio tower by way of illustration and not by way of limitation.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF) device, a session management function (SMF) device, or a user plane function (UPF) device, of a core network for the NR system. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the specific entity to perform user equipment authentication. In some embodiments, a single server rack may handle multiple such functions, such that the connections between core network element 106, authentication server 118, and database 116, may be local connections within a single rack.

Figure 7:
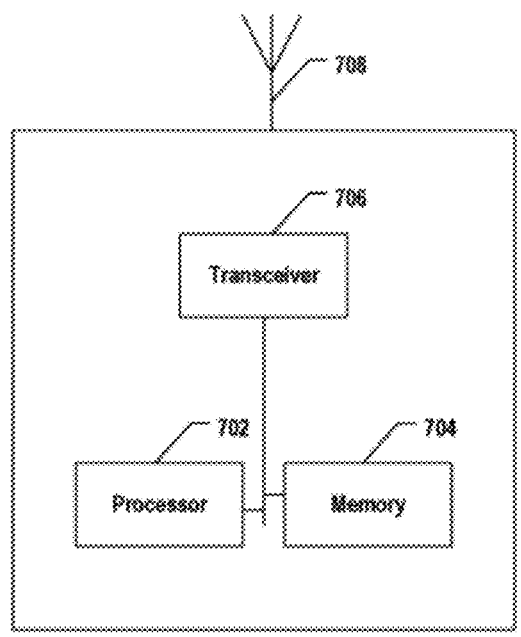
FIG. 7 illustrates a block diagram of a conventional baseband chip.

Each element in FIG. 1 may be considered a node of wireless network 100. More detail regarding the possible implementation of a node is provided by way of example in the description of a node 700 in FIG. 7. Node 700 may be configured as user equipment 102, access node 104, or core network element 106 in FIG. 1. Similarly, node 700 may also be configured as computer 110, router 114, tablet 112, database 116, or authentication server 118 in FIG. 1. As shown in FIG. 7, node 700 may include a processor 702, a memory 704, and a transceiver 706. These components are shown as connected to one another by a bus, but other connection types are also permitted. When node 700 is user equipment 102, additional components may also be included, such as a user interface (UI), sensors, and the like. Similarly, node 700 may be implemented as a blade in a server system when node 700 is configured as core network element 106. Other implementations are also possible.

Transceiver 706 may include any suitable device for sending and/or receiving data. Node 700 may include one or more transceivers, although only one transceiver 706 is shown for simplicity of illustration. An antenna 708 is shown as a possible communication mechanism for node 700. Multiple antennas and/or arrays of antennas may be utilized for receiving multiple spatially multiplex data streams. Additionally, examples of node 700 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 7, node 700 may include processor 702. Although only one processor is shown, it is understood that multiple processors can be included. Processor 702 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 702 may be a hardware device having one or more processing cores. Processor 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 7, node 700 may also include memory 704. Although only one memory is shown, it is understood that multiple memories can be included. Memory 704 can broadly include both memory and storage. For example, memory 704 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 702. Broadly, memory 704 may be embodied by any computer-readable medium, such as a non-transitory computer-readable medium.

Processor 702, memory 704, and transceiver 706 may be implemented in various forms in node 700 for performing wireless communication functions. In some embodiments, processor 702, memory 704, and transceiver 706 of node 700 are implemented (e.g., integrated) on one or more system-on-chips (SoCs). In one example, processor 702 and memory 704 may be integrated on an application processor (AP) SoC (sometimes known as a "host," referred to herein as a "host chip") that handles application processing in an operating system (OS) environment, including generating raw data to be transmitted. In another example, processor 702 and memory 704 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 702 and transceiver 706 (and memory 704 in some cases) may be integrated on an RF SoC (sometimes known as a "transceiver," referred to herein as an "RF chip") that transmits and receives RF signals with antenna 708. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, in some embodiments, any suitable node of wireless network 100 (e.g., user equipment 102 or access node 104) in transmitting signals to another node, for example, from user equipment 102 to access node 104 via, or vice versa, may perform harmonic modeling without interpolation to estimate harmonic interference that is then subtracted from an RX signal, as described below in detail. As a result, compared with known solutions in which modeling via complex polynomial(s) and/or interpolation, the accuracy of harmonic interference estimation/cancellation may be improved while reducing the computational complexity as well as the power consumption.

Figure 2:
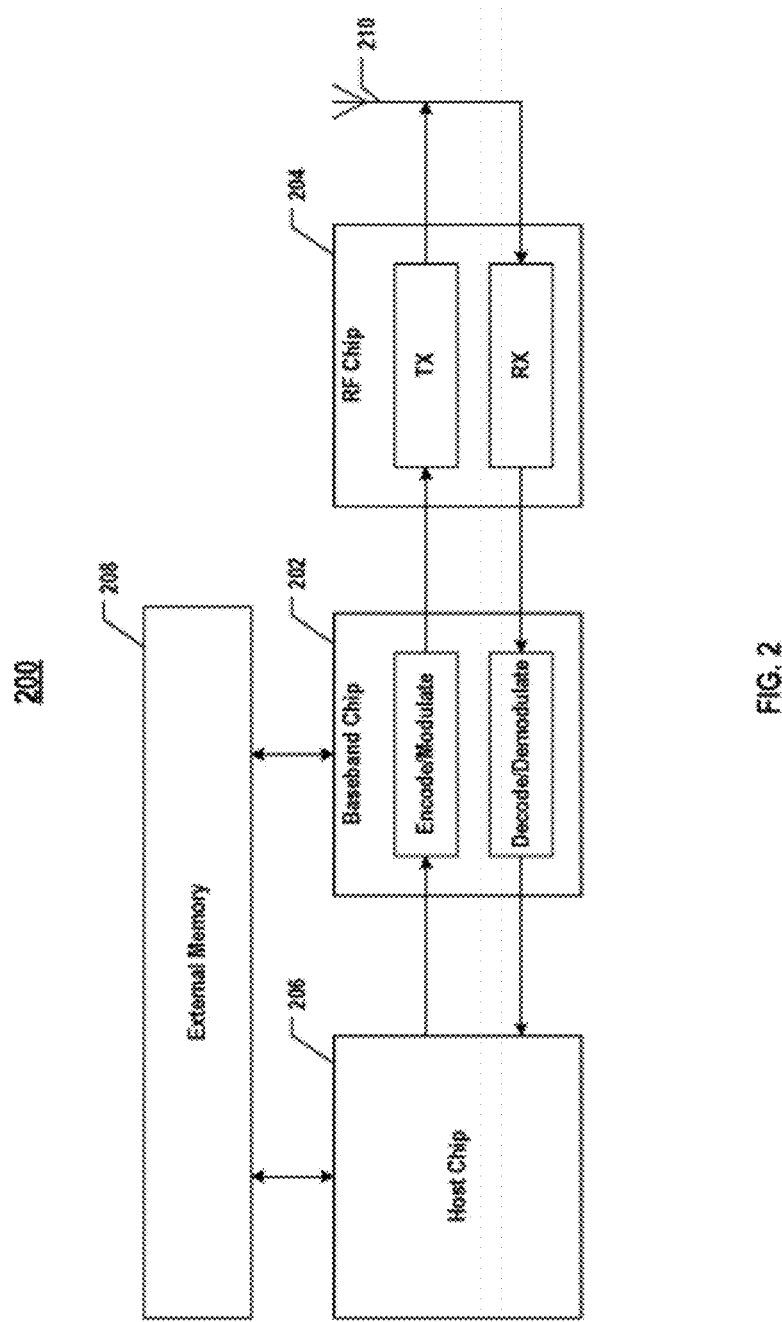
FIG. 2 illustrates a block diagram of an apparatus including a baseband chip, a radio frequency (RF) chip, and a host chip, according to some embodiments of the present disclosure.

FIG. 2 illustrates a block diagram of an apparatus 200 including a baseband chip 202, an RF chip 204, and a host chip 206, according to some embodiments of the present disclosure. Apparatus 200 may be an example of any suitable node of wireless network 100 in FIG. 1, such as user equipment 102 or access node 104. As shown in FIG. 2, apparatus 200 may include baseband chip 202, RF chip 204, host chip 206, and one or more antennas 210. In some embodiments, baseband chip 202 is implemented by processor 702 and memory 704, and RF chip 204 is implemented by processor 702, memory 704, and transceiver 706, as described above with respect to FIG. 7. Besides the on-chip memory (also known as "internal memory," e.g., registers, buffers, or caches) on each chip 202, 204, or 206, apparatus 200 may further include an external memory 208 (e.g., the system memory or main memory) that can be shared by each chip 202, 204, or 206 through the system/main bus. Although baseband chip 202 is illustrated as a standalone SoC in FIG. 2, it is understood that in one example, baseband chip 202 and RF chip 204 may be integrated as one SoC; in another example, baseband chip 202 and host chip 206 may be integrated as one SoC; in still another example, baseband chip 202, RF chip 204, and host chip 206 may be integrated as one SoC, as described above.

In the uplink, host chip 206 may generate raw data and send it to baseband chip 202 for encoding, modulation, and mapping. Baseband chip 202 may also access the raw data generated by host chip 206 and stored in external memory 208, for example, using the direct memory access (DMA). Baseband chip 202 may first encode (e.g., by source coding and/or channel coding) the raw data and modulate the coded data using any suitable modulation techniques, such as multi-phase pre-shared key (MPSK) modulation or quadrature amplitude modulation (QAM). Baseband chip 202 may perform any other functions, such as symbol or layer mapping, to convert the raw data into a signal that can be used to modulate the carrier frequency for transmission. In the uplink, baseband chip 202 may send the modulated signal to RF chip 204. RF chip 204, through the transmitter, may convert the modulated signal in the digital form into analog signals, i.e., RF signals, and perform any suitable front-end RF functions, such as filtering, up-conversion, or sample-rate conversion. Antenna 210 (e.g., an antenna array) may transmit the RF signals provided by the transmitter of RF chip 204.

In the downlink, antenna 210 may receive RF signals and pass the RF signals to the receiver (Rx) of RF chip 204. RF chip 204 may perform any suitable front-end RF functions, such as filtering, down-conversion, or sample-rate conversion, and convert the RF signals into low-frequency digital signals (baseband signals) that can be processed by baseband chip 202. In the downlink, baseband chip 202 may demodulate and decode the baseband signals to extract raw data that can be processed by host chip 206. Baseband chip 202 may perform additional functions, such as error checking, de-mapping, channel estimation, descrambling, etc. The raw data provided by baseband chip 202 may be sent to host chip 206 directly or stored in external memory 208.

In certain implementations, baseband chip 202 may perform operations associated with the harmonic interference estimation described below, e.g., in connection with FIGS. 3-6. The operations may be performed by one or more functional blocks of the baseband chip 202. For example, although not illustrated in FIG. 2, the baseband chip 202 may include a transmitter configured to transmit a first signal. The baseband chip 202 may also include a receiver configured to receive a second signal, where the first signal and the second signal may be transmitted and received concurrently via CA. The second signal may include a receive signal portion and a harmonic interference portion, and the harmonic interference portion may be associated with a leakage of the first signal to the receiver. Still further, the baseband chip 202 may include a harmonic model block configured to multiply a first output from a first harmonic model associated with an AMPM LUT and a second output of a second harmonic model associated with an AMAM LUT to generate a third output, and estimate the harmonic interference portion based at least in part on the third output. The baseband chip 202 may further include an interference cancellation block configured to cancel the harmonic interference portion from the second signal to obtain the receive signal portion. As compared with known solutions in which harmonic interference is estimated using a complex polynomial and/or interpolation, the baseband chip 202 may estimate harmonic interference using a significantly reduced amount of power and with a reduced silicon footprint as compared to those conventional approaches discussed above. Additional details of the present technique(s) to estimate and remove harmonic interference are described below in connection with FIGS. 3-6.

Figure 3:
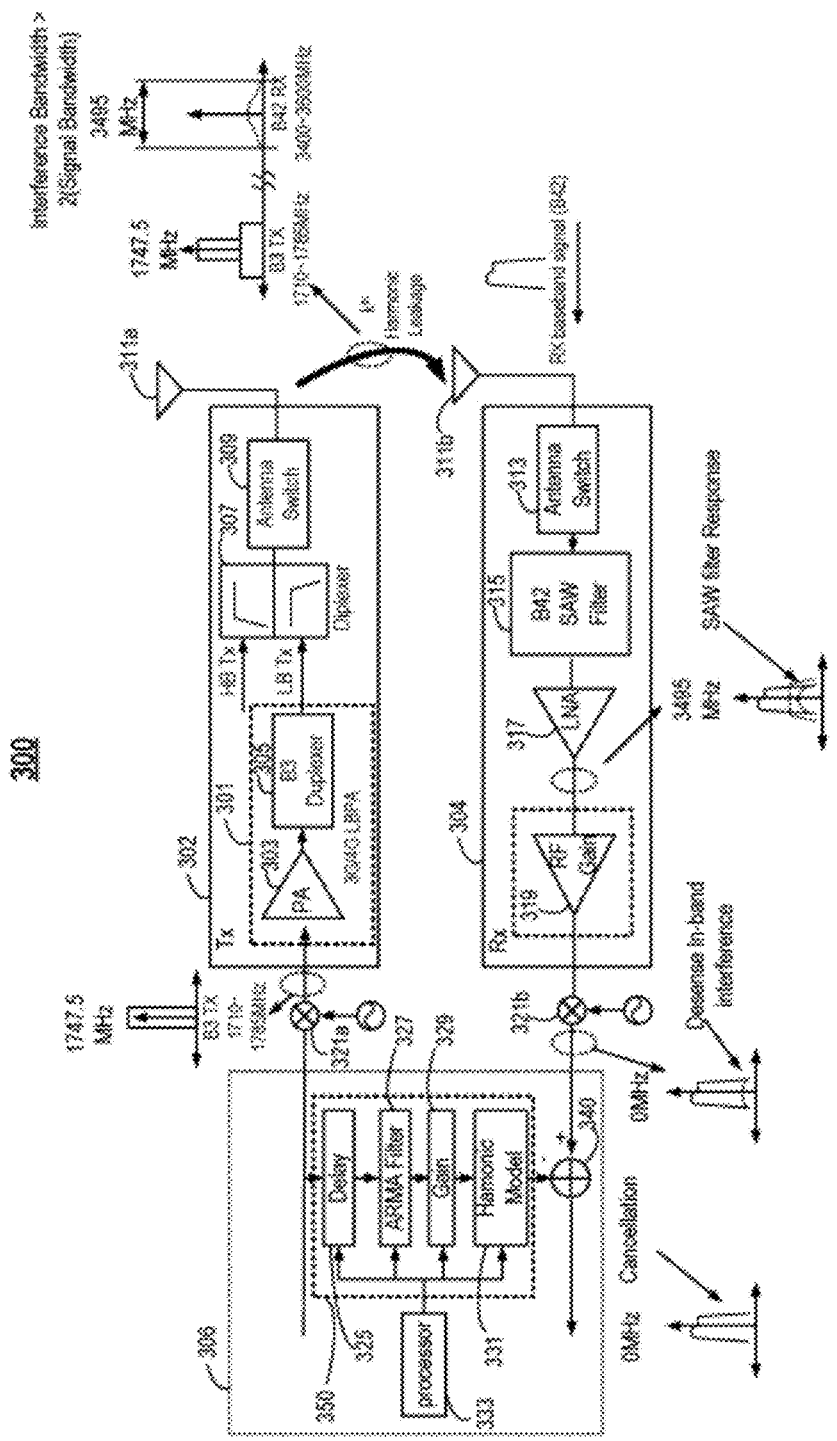
FIG. 3 illustrates a first block diagram of an exemplary baseband chip including a harmonic model block, according to some embodiments of the present disclosure.

FIG. 3 illustrates a first block diagram of an exemplary baseband chip 300 including a harmonic model block, according to some embodiments of the present disclosure. FIG. 4 illustrates a detailed view 370 of the harmonic model block 350 of FIG. 3, according to some embodiments of the present disclosure. As seen in FIGS. 3 and 4, the harmonic model block 350 may include a plurality of sub-blocks 325, 327, 329, 331, 351, 353, 355, 357, 359, 361, and 363. In certain implementations, the harmonic model block 350 and each of the plurality of sub-blocks listed above may be implemented as hardware. In other words, functional blocks 350, 325, 327, 329, 331, 351, 353, 355, 357, 359, 361, and 363 may each be implemented as an integrated circuit (e.g., ASIC) each configured to perform a dedicated function and/or computation. In certain other implementations, the harmonic model block 350 and each of the plurality of sub-blocks listed above may be implemented as software. Here, the processor 333 may be configured to instruct each of the functional blocks to perform a dedicated function and/or computation based on instructions maintained in memory. FIGS. 3 and 4 will be described together.

Referring to FIG. 3, baseband chip 300 may include, e.g., a transmitter 302, a receiver 304, and a modem 306. A transmit (TX) baseband signal may be provided to transmitter 302 as an output of the modem 306. The TX baseband signal may include both a real I component and an imaginary Q component, although a person of ordinary skill would understand that, as with many information-bearing complex signals, the real I component and/or the imaginary Q component may at times be zero. The I and Q components of the TX baseband signal may be input into harmonic model block 350 as shown in FIG. 4, for use in estimating harmonic interference leaked from the transmitter 302 to the receiver 304.

Transmitter 302 may include, e.g., an L-band power amplifier (LBPA) 301 with a power amplifier (PA) 303 (e.g., envelope tracking PA (ETPA), a class AB PA, etc.) and a duplexer 305 that may be a band 3 (B3) or band 4 (B4) duplexer, just to name a few. A high band (HB) TX signal and a low band (LB) TX signal may be output from the LBPA 301 to a diplexer 307 (e.g., low pass and high pass filter to isolate the low and high band signal), which may output the TX baseband signal to an antenna switch 309. Antenna 311a may be configured to transmit the TX baseband signal to a remote terminal (e.g., UE, eNB, gNB, etc.). In the example implementation illustrated in FIG. 3, the TX baseband signal (e.g., first signal) is transmitted using B3, which includes the frequency band 1710-1785 MHz with a center frequency of 1747.5 MHz. However, the TX baseband signal may be transmitted on any frequency band without departing from the scope of the present disclosure. Harmonic interference (e.g., $k^{th}$ harmonic interference) may be generated in the transmitter 302 due to the nonlinearity of PA 303 and the up-converter 321a.

The harmonic interference near the receive band 42 (B42) center frequency may be leaked from the transmitter via the, e.g., diplexer 307. When the $k^{th}$ harmonic interference is of the $2^{nd}$ order, the interference may be out-of-band interference, meaning that the harmonic interference occurs in a frequency band other than the one on which the RX baseband signal is received. On the other hand, when the $k^{th}$ harmonic interference is of the $3^{rd}$ order, the harmonic interference may be in-band (e.g., B42), meaning that the harmonic interference occurs in the frequency band on which the RX baseband signal is received.

Receiver 304 may include antenna 311b that is configured to receive an RX baseband signal on B42. B42 may include the frequency band from 3400-3600 MHz with a center frequency of 3495 MHz, and the $k^{th}$ harmonic interference near 3495 MHz may be leaked by the transmitter 302 and combined with the RX baseband signal at the receiver 304. However, the RX baseband signal is not limited to being received may be received on any frequency band without departing from the scope of the present disclosure.

More specifically, receiver 304 may include an antenna switch 313, a B42 SAW filter 315 configured to filter out-of-band noise from the RX baseband signal, a low noise amplifier (LNA) 317, and an RF gain 319 that outputs a pre-cancellation signal (e.g., a second signal) to a down converter 321b, which sends a pre-cancellation signal to the interference cancellation block 340 of modem 306. The pre-cancellation signal (e.g., second signal) may include a receive signal portion and an interference portion. The pre-cancellation signal may include both a real I component and an imaginary Q component, although a person of ordinary skill would understand that, as with many information-bearing complex signals, the real I component and/or the imaginary Q component may at times be zero. As shown in FIG. 4, receiver 304 may include an analog-to-digital converter (ADC) 335 and a digital down converter 337.

Modem 306 includes a harmonic model block 350 configured to estimate the $k^{th}$ harmonic interference generated and leaked by the transmitter 302. In other words, the harmonic model block 350 is configured to estimate the interference portion of the pre-cancellation signal. More specifically, harmonic model block 350 may include various sub-blocks that perform operations that, in totality, generate an estimation of the harmonic interference leaked by the transmitter 302.

Harmonic model block 350 may include, e.g., a delay block 325, an auto regression moving average (ARMA) filter block 327, a gain block 329, and a harmonic model 331 (e.g., AMPM LUT, AMAM LUT, etc.). Moreover, modem 306 may include a processor 333 configured to instruct the sub-blocks 325, 327, 329, 331 of the harmonic model block 350 to perform various operations associated with interference estimation. In certain implementations, processor 333 may be configured to determine which $k^{th}$ order harmonic interference to cancel, and depending on the determined $k^{th}$ order may instruct harmonic model block 350 to estimate the $k^{th}$ (e.g., $2^{nd}$ order, $3^{rd}$ order, $4^{th}$ order, etc.) order harmonic interference. The order of the harmonic interference may be included in processor at the time of manufacture, and processor 333 may be configured to generate one or more of the AMPM LUT and/or the AMAM LUT to cancel the harmonic interference. Harmonic model block 350 may include a harmonic model 331 for each of a plurality of $k^{th}$ order harmonic interference. For example, harmonic model 331 may include a $2^{nd}$ order harmonic interference model, a $3^{rd}$ order harmonic interference model, a $4^{th}$ order harmonic interference model, and so on. Then, based on the instruction from the processor 333, the harmonic model 331 may select the associated $k^{th}$ order harmonic model (e.g., $k^{th}$ order AMAM LUT and $k^{th}$ order AMPM LUT) for use in estimating the $k^{th}$ order harmonic interference for cancellation.

Referring to FIG. 4, harmonic model block 350 may include a delay block 325, a first coordinate rotation digital computer (CORDIC) 351, a linear harmonic phase estimator block 353, a gain block 329, a harmonic model 331 that includes an AMAM LUT 355 and an AMPM LUT 357, an adder 363, a second CORDIC 359, a multiplier 361, and an ARMA filter 327. Additional details of each of these sub-blocks will be described below in connection with FIG. 4.

Delay block 325 may be configured to receive I and Q components of the TX baseband signal, which may be used to align the received harmonic interference portion of the pre-cancellation signal. In certain implementations, coarse alignment may be achieved using cross-correlation. Fine alignment may be determined by the cancellation performance by tuning the fractional delay in delay block 325. Delay block 325 may be configured to input the I and Q components of the TX baseband signal into first CORDIC 351. First CORDIC 351 may be configured to convert the TX baseband signal from rectangular to polar form. The resulting polar TX baseband signal includes information associated with an amplitude A of the transmission envelope (also referred to as "transmission envelope magnitude") and TX phase φ.

The information associated with the amplitude A of the transmission envelope may be input into the gain block 329, and information associated with the TX phase tri may be input into linear harmonic phase estimator block 353. Gain block 329 may be configured to adjust the transmission envelope based at least in part on the output power of PA 303 and/or LBPA 301 to generate an adjusted transmission envelope.

In other words, gain block 329 may be configured to select an indexing range used by the harmonic model 331 to determine a magnitude (in volts) of the harmonic interference based at least in part on the adjusted TX envelope. For example, referring to FIG. 5, assuming the harmonic model in the AMAM LUT 355 models the magnitude of harmonic interference as a function of transmission envelopes (e.g., transmission envelopes from 17 dBm to 25 dBm). As an example, when the adjusted TX of average output power is 25 dBm, harmonic model 331 may select the entire model shown in FIG. 5 to generate information associated with the harmonic magnitude. On the other hand, when the adjusted TX envelope is 24 dBm, harmonic model 331 may select a truncated portion of the model from 0 to 24 dBm to generate information associated with the harmonic magnitude. For example, the truncated portion may include the information in the model from 0 to 0.9 of the input but not the portion from 0.9 to 1 since that portion of the model is associated with a transmission envelope of 25 dBm.

AMPM LUT 357 may maintain another harmonic model configured to output an estimated phase shift Δφ between the $k^{th}$ harmonic TX phase φ and the $k^{th}$ harmonic interference present in the pre-cancellation signal. AMPM LUT 357 may estimate the phase shift Δφ using linear interpolation of a mapped relationship between this phase shift Δφ and the adjusted TX envelope.

Linear harmonic phase estimator block 353 may be configured to determine TX phase change rate of (N−1)φ, which may be added to the estimated phase shift Δφ using adder 363. Here, 'N' is the order of the targeting harmonic to be cancelled.

Furthermore, harmonic model block 350 may further include an adder 363 configured to add the harmonic phase shift Δφ and the harmonic TX phase rate estimate (N−1)×, resulting in an estimated phase of the $k^{th}$ harmonic interference phase. The estimated kth harmonic interference phase and the estimated $k^{th}$ harmonic interference envelope are both provided to second CORDIC 359, which may be configured to convert these signals from polar to rectangular form, resulting in I and Q components of the harmonic interference magnitude and the harmonic interference phase. The I and Q components of the harmonic interference magnitude and the harmonic interference phase may be combined using multiplier 361, which may include three multipliers, to generate a noisy interference estimate. The noisy interference estimate may be provided to ARMA filter 327 that outputs I and Q components of a filtered harmonic interference estimate by removing, among others, dispersion caused by antenna mismatch between the transmitter 302 and receiver 304.

This filtered harmonic interference estimate may be subtracted from the pre-cancellation signal (e.g., second signal) by interference cancellation block 340, resulting in I and Q components of the receive signal portion without harmonic interference. The receive signal portion may be output to another component of modem 306 for processing.

Figure 6A:
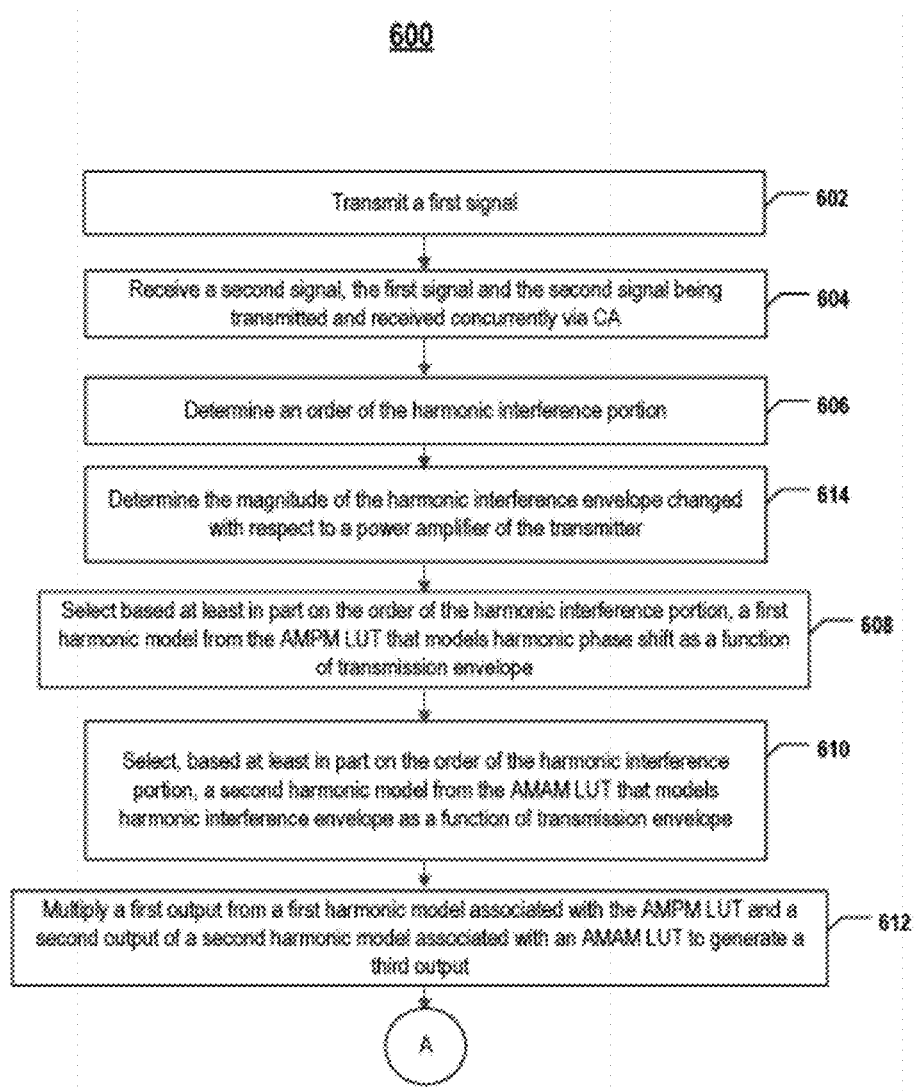
FIGS. 6A and 6B illustrate a flow chart of an exemplary method of canceling harmonic interference without interpolation, according to some embodiments of the present disclosure.
Figure 6B:
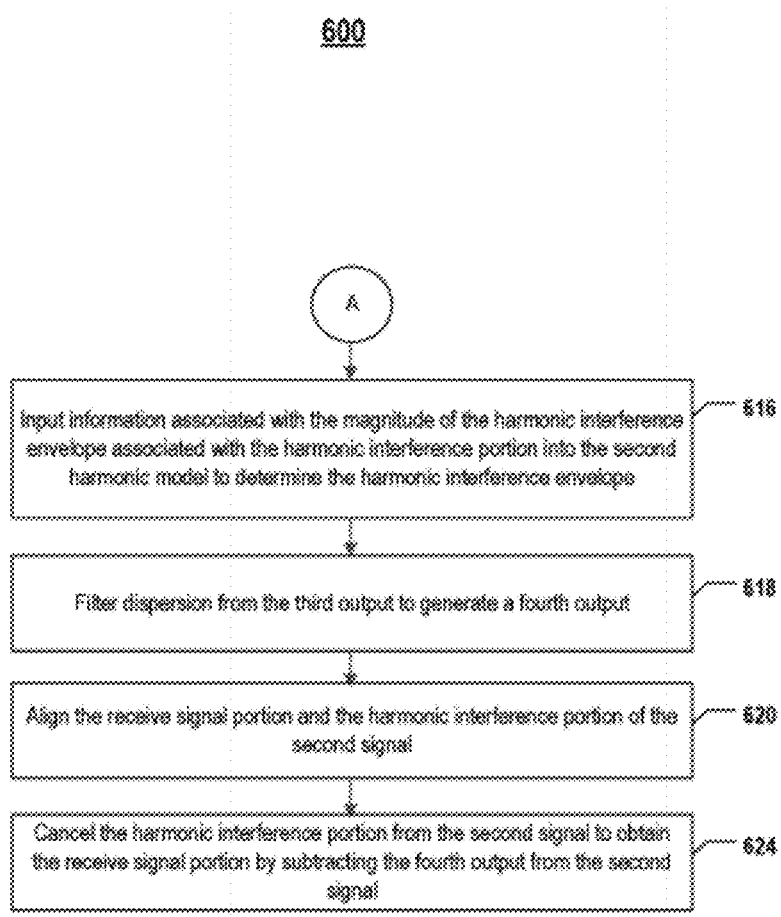

FIGS. 6A and 6B illustrate a flow chart of an exemplary method 600 for wireless communication, according to some embodiments of the present disclosure. Examples of the apparatus that can perform operations of method 600 include, for example, modem 306 (also referred to as a "baseband chip") depicted in FIG. 3 or any other suitable apparatus disclosed herein. It is understood that the operations shown in method 600 are not exhaustive and that other operations can be performed as well before, after, or between any of the illustrated operations. Further, some of the operations may be performed simultaneously, or in a different order than shown in FIGS. 6A and 6B.

Referring to FIG. 6A, at 602, the baseband chip may transmit, by a transmitter, a first signal. For example, referring to FIG. 3, antenna 311a may be configured to transmit the TX baseband signal to a remote terminal (e.g., UE, eNB, gNB, etc.). In the example implementation illustrated in FIG. 3, the TX baseband signal (e.g., first signal) is transmitted using B3, which includes the frequency band 1710-1785 MHz with a center frequency of 1747.5 MHz. However, the TX baseband signal may be transmitted on any frequency band without departing from the scope of the present disclosure.

At 604, the baseband chip may receive, by a receiver, a second signal. In certain aspects, the first signal and the second signal may be transmitted and received concurrently via CA. In certain other aspects, the second signal may include a receive signal portion and a harmonic interference portion. In further aspects, the harmonic interference portion may be associated with a leakage of the first signal to the receiver. For example, referring to FIG. 3, receiver 304 may include antenna 311b that is configured to receive an RX baseband signal on B42. B42 may include the frequency band from 3400-3600 MHz with a center frequency of 3495 MHz, and the $k^{th}$ harmonic interference near 3495 MHz may be leaked by the transmitter 302 and combined with the RX baseband signal at the receiver 304. However, the RX baseband signal is not limited to being received may be received on any frequency band without departing from the scope of the present disclosure.

At 606, the baseband chip may determine an order of the harmonic interference portion. For example, referring to FIG. 3, processor 333 may be configured to determine which $k^{th}$ order harmonic interference to cancel, and depending on the determined $k^{th}$ order may instruct harmonic model block 350 to estimate the $k^{th}$ (e.g., $2^{nd}$ order, $3^{rd}$ order, $4^{th}$ order, etc.) order harmonic interference.

At 608, the baseband chip may determine the magnitude of the harmonic interference envelope changed with respect to a power amplifier of the transmitter. For example, referring to FIG. 4, gain block 329 may be configured to adjust the transmission envelope based at least in part on the output power of PA 303 and/or LBPA 301 to generate an adjusted transmission envelope. In other words, gain block 329 may be configured to select an indexing range used by the harmonic model 331 to determine a magnitude (in volts) of the harmonic interference based at least in part on the adjusted TX envelope.

At 610, the baseband chip may select, based at least in part on the order of the harmonic interference portion, a first harmonic model from the AMPM LUT that models harmonic phase shift as a function of transmission envelope. For example, referring to FIG. 4, AMPM LUT 357 may maintain a harmonic model configured to output an estimated phase shift $\Delta\varphi$ between the $k^{th}$ harmonic TX phase $\varphi$ and the $k^{th}$ harmonic interference present in the pre-cancellation signal. AMPM LUT 357 may estimate the phase shift $\Delta\varphi$ using linear interpolation of a mapped relationship between this phase shift $\Delta\varphi$ and the adjusted TX envelope.

At 612, the baseband chip may select, based at least in part on the order of the harmonic interference portion, a second harmonic model from the AMAM LUT that models harmonic interference envelope as a function of transmission envelope. The harmonic interference envelope may be associated with the $k^{th}$ order of the harmonic interference portion. For example, referring to FIG. 5, assuming the harmonic model in the AMAM LUT 355 models the magnitude of harmonic interference as a function of transmission envelopes (e.g., transmission envelopes from 17 dBm to 25 dBm). As an example, when the adjusted TX envelope is 25 dBm, harmonic model 331 may select the entire model shown in FIG. 5 to generate information associated with the harmonic magnitude. On the other hand, when the adjusted TX envelope is 24 dBm, harmonic model 331 may select a truncated portion of the model from 0 to 24 dBm to generate information associated with the harmonic magnitude. For example, the truncated portion may include the information in the model from 0 to 0.9 of the input but not the portion from 0.9 to 1 since that portion of the model is associated with a transmission envelope of 25 dBm.

At 614, the baseband chip may multiply a first output from a first harmonic model associated with the AMPM LUT and a second output of a second harmonic model associated with the AMAM LUT to generate a third output. For example, referring to FIG. 4, the I and Q components of the harmonic interference magnitude and the harmonic interference phase may be combined using multiplier 361, which may include three multipliers, to generate a noisy interference estimate.

Referring to FIG. 6B, at 616, the baseband chip may input information associated with the magnitude of the harmonic interference envelope associated with the harmonic interference portion into the second harmonic model to determine the harmonic interference envelope. For example, referring to FIG. 4, gain block 329 may input information associated with the indexing range into the AMAM LUT 355.

At 618, the baseband chip may filter dispersion from the third output to generate a fourth output. The dispersion may be associated with an antenna mismatch of the transmitter and receiver. The fourth output is the estimated interference portion. For example, referring to FIG. 4, the noisy interference estimate (e.g., third output) may be provided to ARMA filter 327 that outputs I and Q components of a filtered harmonic interference estimate (e.g., fourth output) by removing, among others, dispersion caused by, antenna mismatch between the transmitter 302 and receiver 304.

At 620, the baseband chip may align the receive signal portion and the harmonic interference portion of the second signal. For example, referring to FIG. 4, delay block 325 may be configured to receive I and Q components of the TX baseband signal, which may be used to align the receive signal portion and the harmonic interference portion of the pre-cancellation signal. Delay block 325 may be configured to input the I and Q components of the TX baseband signal into first CORDIC 351.

At 622, the baseband chip may cancel the harmonic interference portion from the second signal to obtain the receive signal portion by subtracting the harmonic interference portion (e.g., fourth output) from the second signal. For example, referring to FIG. 4, the filtered harmonic interference estimate may be subtracted from the pre-cancellation signal (e.g., second signal) by interference cancellation block 340, resulting in I and Q components of the receive signal portion without harmonic interference.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 700 in FIG. 7. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, a baseband chip is disclosed. The baseband chip may include a transmitter configured to transmit a first signal. The baseband chip may also include a receiver configured to receive a second signal. The first signal and the second signal may be transmitted and received concurrently via CA. The second signal may include a receive signal portion and a harmonic interference portion. The harmonic interference portion may be associated with a leakage of the first signal to the receiver. The baseband chip may further include a harmonic model block configured to multiply a first output from a first harmonic model associated with an AMPM LUT and a second output of a second harmonic model associated with an AMAM LUT to generate a third output. The harmonic model block may be further configured to estimate the harmonic interference portion based at least in part on the third output. The baseband chip may also include an interference cancellation block configured to cancel the harmonic interference portion from the second signal to obtain the receive signal portion.

The harmonic model block may be further configured to determine an order of the harmonic interference portion. The harmonic model block may also be configured to select, based at least in part on the order of the harmonic interference portion, the first harmonic model from the AMPM LUT that models transmission envelope as a function of a harmonic phase shift. The harmonic model block may further be configured to select, based at least in part on the order of the harmonic interference portion, the second harmonic model from the AMAM LUT that models transmission envelope as a function of a magnitude of a harmonic interference envelope. The harmonic interference envelope may be associated with the order of the harmonic interference portion.

The second harmonic model may generate an output without interpolation.

The harmonic model block may include a gain block configured to determine the magnitude of the harmonic interference envelope changed with respect to a power amplifier of the transmitter. The gain block may be further configured to input information associated with the magnitude of the harmonic interference envelope associated with the harmonic interference portion into the second harmonic model to determine the harmonic interference envelope. The magnitude of the harmonic interference envelope may be the second output of the second harmonic model.

The harmonic model block may also include an AMAM filter configured to filter dispersion from the third output to generate a fourth output. The dispersion may be associated with an antenna mismatch of the transmitter and receiver. The fourth output may be the estimated harmonic interference portion.

The harmonic model block may further include a delay block configured to align the receive signal portion and the harmonic interference portion of the second signal.

The harmonic model block may be further configured to subtract a phase of the first signal raised to a power of the order of the harmonic interference portion subtracted from a phase shift associated with the order of the harmonic interference portion.

According to another aspect of the present disclosure, a baseband chip is provided that includes a transmitter configured to transmit a first signal, and a receiver configured to receive a second signal, where the first signal and the second signal may be transmitted and received concurrently via CA. The second signal may be a receive signal portion and a harmonic interference portion. The harmonic interference portion may be associated with a leakage of the first signal to the receiver. The baseband chip may further include a memory and at least one processor coupled to the memory and configured to perform various operations associated with harmonic interference cancellation. The at least one processor may be configured to multiply a first output from a first harmonic model associated with an AMPM LUT and a second output of a second harmonic model associated with an AMAM LUT to generate a third output. The at least one processor may be further configured to estimate the harmonic interference portion based at least in part on the third output. The at least one processor may also be configured to cancel the harmonic interference portion from the second signal to obtain the receive signal portion.

The at least one processor may be further configured to determine an order of the harmonic interference portion. The at least one processor may also be configured to select, based at least in part on the order of the harmonic interference portion, the first harmonic model from the AMPM LUT that models transmission envelope as a function of a harmonic phase shift. The at least one processor may be further configured to select, based at least in part on the order of the harmonic interference portion, the second harmonic model from the AMAM LUT that models transmission envelope as a function of a magnitude of a harmonic interference envelope. The harmonic interference envelope may be associated with the order of the harmonic interference portion.

The second model may generate an output without interpolation.

The at least one processor may be further configured to determine the magnitude of the harmonic interference envelope changed with respect to a power amplifier of the transmitter. The at least one processor may be also configured to input information associated with the magnitude of the harmonic interference envelope associated with the harmonic interference portion into the second harmonic model to determine the harmonic interference envelope. The magnitude of the harmonic interference envelope may be the second output of the second harmonic model.

The at least one processor may be further configured to filter dispersion from the third output to generate a fourth output. The dispersion may be associated with an antenna mismatch of the transmitter and receiver. The fourth output may be the estimated harmonic interference portion.

The at least one processor may be further configured to align the receive signal portion and the harmonic interference portion of the second signal.

The at least one processor may be further configured to subtract a phase of the first signal raised to a power of the order of the harmonic interference portion subtracted from a phase shift associated with the order of the harmonic interference portion.

According to another aspect of the present disclosure, a method of wireless communication is provided. The method may include transmitting, by a transmitter, a first signal. The method may further include receiving, by a receiver, a second signal, the first signal and the second signal being transmitted and received concurrently via CA. The second signal may include a receive signal portion and a harmonic interference portion. The harmonic interference portion may be associated with a leakage of the first signal to the receiver. The method may also include multiplying a first output from a first harmonic model associated with an AMPM LUT and a second output of a second harmonic model associated with an AMAM LUT to generate a third output. The method may further include estimating the harmonic interference portion based at least in part on the third output. The method may also include cancelling the harmonic interference portion from the second signal to obtain the receive signal portion.

The method may further include determining an order of the harmonic interference portion. The method may also include selecting, based at least in part on the order of the harmonic interference portion, the first harmonic model from the AMPM LUT that models transmission envelope as a function of a harmonic phase shift. The method may further include selecting, based at least in part on the order of the harmonic interference portion, the second harmonic model from the AMAM LUT that models transmission envelope as a function of a magnitude of a harmonic interference envelope. The harmonic interference envelope may be associated with the order of the harmonic interference portion.

The second model may generate an output without interpolation.

The method may further include determining the magnitude of the harmonic interference envelope changed with respect to a power amplifier of the transmitter. The method may also include inputting information associated with the magnitude of the harmonic interference envelope associated with the harmonic interference portion into the second harmonic model to determine the harmonic interference envelope. The magnitude of the harmonic interference envelope may be the second output of the second harmonic model.

The method may further include filtering dispersion from the third output to generate a fourth output. The dispersion may be associated with an antenna mismatch of the transmitter and receiver. The fourth output may be the estimated harmonic interference portion.

The method may further include aligning the receive signal portion and the harmonic interference portion of the second signal.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A baseband chip, comprising:
a transmitter configured to transmit a first signal;
a receiver configured to receive a second signal, the first signal and the second signal being transmitted and received concurrently via carrier aggregation (CA), the second signal including a receive signal portion and a harmonic interference portion, the harmonic interference portion being associated with a leakage of the first signal to the receiver;
a harmonic model block configured to:
multiply a first output from a first harmonic model associated with an amplitude modulation phase modulation (AMPM) look-up table (LUT) and a second output of a second harmonic model associated with an amplitude modulation amplitude modulation (AMAM) LUT to generate a third output; and
estimate the harmonic interference portion based at least in part on the third output; and
an interference cancellation block configured to cancel the harmonic interference portion from the second signal to obtain the receive signal portion,
wherein the harmonic model block is further configured to:
determine an order of the harmonic interference portion;
select, based at least in part on the order of the harmonic interference portion, the first harmonic model from the AMPM LUT that models transmission envelope as a function of a harmonic phase shift; and
select, based at least in part on the order of the harmonic interference portion, the second harmonic model from the AMAM LUT that models transmission envelope as a function of a magnitude of a harmonic interference envelope, the harmonic interference envelope being associated with the order of the harmonic interference portion.

2. The baseband chip of claim 1, wherein the first harmonic model models transmission envelope as the function of the harmonic phase shift without interpolation.

3. The baseband chip of claim 1, wherein the harmonic model block includes a gain block configured to:
determine the magnitude of the harmonic interference envelope changed with respect to a power amplifier of the transmitter; and input information associated with the magnitude of the harmonic interference envelope associated with the harmonic interference portion into the second harmonic model to determine the harmonic interference envelope, wherein the magnitude of the harmonic interference envelope being the second output of the second harmonic model.

4. The baseband chip of claim 3, wherein the harmonic model block includes an AMAM filter configured to:
filter dispersion from the third output to generate a fourth output,
wherein the dispersion is associated with an antenna mismatch of the transmitter and receiver, and
wherein the fourth output is the estimated harmonic interference portion.

5. The baseband chip of claim 4, wherein the harmonic model block includes a delay block configured to:
align the receive signal portion and the harmonic interference portion of the second signal.

6. The baseband chip of claim 5, wherein the harmonic model block is further configured to:
subtract a phase of the first signal raised to a power of the order of the harmonic interference portion subtracted from a phase shift associated with the order of the harmonic interference portion.

7. A baseband chip, comprising:
a transmitter configured to transmit a first signal;
a receiver configured to receive a second signal, the first signal and the second signal being transmitted and received concurrently via carrier aggregation (CA), the second signal including a receive signal portion and a harmonic interference portion, the harmonic interference portion being associated with a leakage of the first signal to the receiver;
a memory; and
at least one processor coupled to the memory and configured to:
multiply a first output from a first harmonic model associated with an amplitude modulation phase modulation (AMPM) look-up table (LUT) and a second output of a second harmonic model associated with an amplitude modulation amplitude modulation (AMAM) LUT to generate a third output;
estimate the harmonic interference portion based at least in part on the third output; and
cancel the harmonic interference portion from the second signal to obtain the receive signal portion,
wherein the at least one processor is further configured to:
determine an order of the harmonic interference portion;
select, based at least in part on the order of the harmonic interference portion, the first harmonic model from the AMPM LUT that models transmission envelope as a function of a harmonic phase shift; and
select, based at least in part on the order of the harmonic interference portion, the second harmonic model from the AMAM LUT that models transmission envelope as a function of a magnitude of a harmonic interference envelope, the harmonic interference envelope being associated with the order of the harmonic interference portion.

8. The baseband chip of claim 7, wherein the AMPM LUT models transmission envelope as the function of the harmonic phase shift without interpolation.

9. The baseband chip of claim 7, wherein the at least one processor is further configured to:
determine the magnitude of the harmonic interference envelope changed with respect to a power amplifier of the transmitter; and
input information associated with the magnitude of the harmonic interference envelope associated with the harmonic interference portion into the second harmonic model to determine the harmonic interference envelope,
wherein the magnitude of the harmonic interference envelope being the second output of the second harmonic model.

10. The baseband chip of claim 9, wherein the at least one processor is further configured to:
filter dispersion from the third output to generate a fourth output,
wherein the dispersion is associated with an antenna mismatch of the transmitter and receiver, and
wherein the fourth output is the estimated harmonic interference portion.

11. The baseband chip of claim 10, wherein the at least one processor is further configured to:
align the receive signal portion and the harmonic interference portion of the second signal.

12. The baseband chip of claim 11, wherein the at least one processor is further configured to:
subtract a phase of the first signal raised to a power of the order of the harmonic interference portion subtracted from a phase shift associated with the order of the harmonic interference portion.

13. A method of wireless communication, comprising:
transmitting, by a transmitter, a first signal;
receiving, by a receiver, a second signal, the first signal and the second signal being transmitted and received concurrently via carrier aggregation (CA), the second signal including a receive signal portion and a harmonic interference portion, the harmonic interference portion being associated with a leakage of the first signal to the receiver;
multiplying a first output from a first harmonic model associated with an amplitude modulation phase modulation (AMPM) look-up table (LUT) and a second output of a second harmonic model associated with an amplitude modulation amplitude modulation (AMAM) LUT to generate a third output;
estimating the harmonic interference portion based at least in part on the third output;
cancelling the harmonic interference portion from the second signal to obtain the receive signal portion;
determining an order of the harmonic interference portion;
selecting, based at least in part on the order of the harmonic interference portion, the first harmonic model from the AMPM LUT that models transmission envelope as a function of a harmonic phase shift; and
selecting, based at least in part on the order of the harmonic interference portion, the second harmonic model from the AMAM LUT that models transmission envelope as a function of a magnitude of a harmonic interference envelope, the harmonic interference envelope being associated with the order of the harmonic interference portion.

14. The method of claim 13, wherein the AMPM LUT models transmission envelope as the function of the harmonic phase shift without interpolation.

15. The method of claim 13, further comprising determining the magnitude of the harmonic interference envelope changed with respect to a power amplifier of the transmitter; and inputting information associated with the magnitude of the harmonic interference envelope associated with the harmonic interference portion into the second harmonic model to determine the harmonic interference envelope, wherein the magnitude of the harmonic interference envelope being the second output of the second harmonic model.

16. The method of claim 15, further comprising:

filtering dispersion from the third output to generate a fourth output, wherein the dispersion is associated with an antenna mismatch of the transmitter and receiver, and wherein the fourth output is the estimated harmonic interference portion.

17. The method of claim 16, further comprising:

aligning the receive signal portion and the harmonic interference portion of the second signal.

* * * * *